Figure 1:
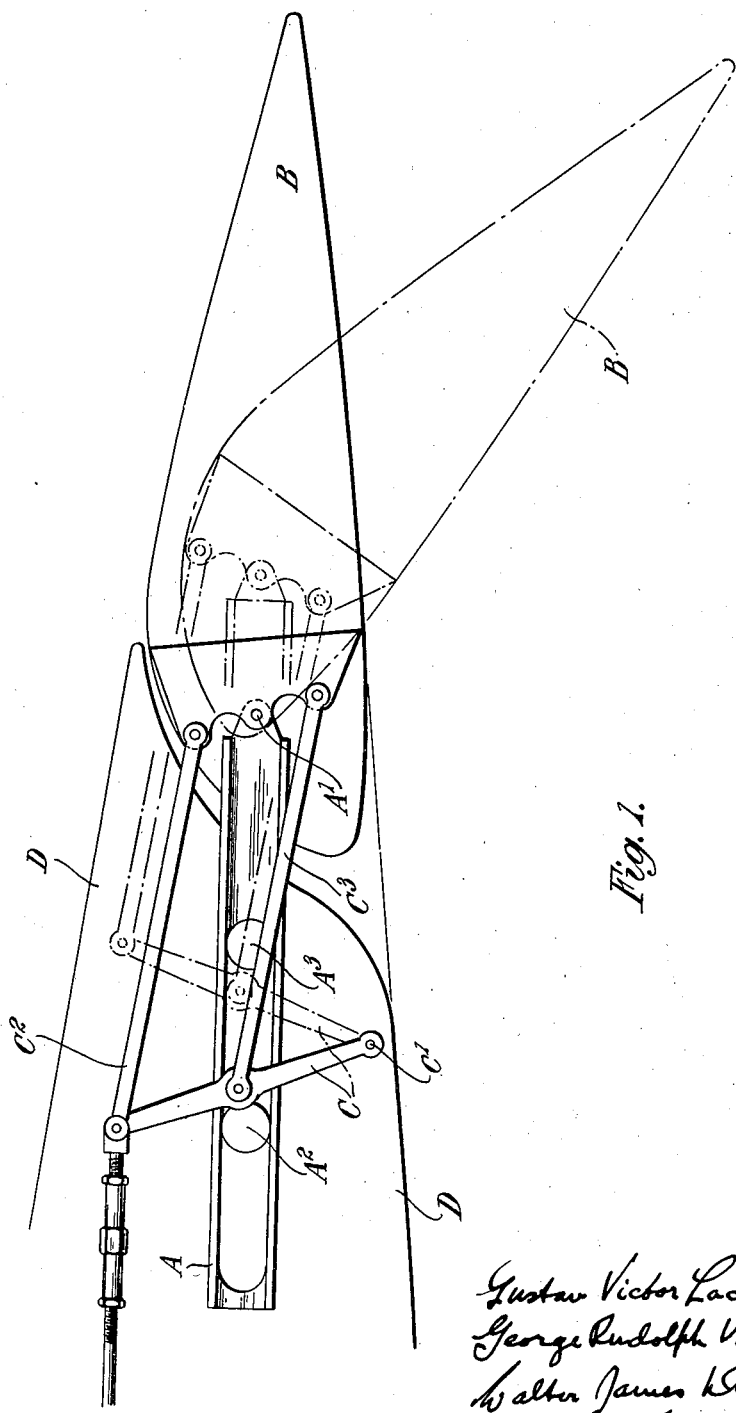

July 6, 1937.  G. V. LACHMANN ET AL  2,086,085
AIRCRAFT CONTROL GEAR
Filed Oct. 3, 1935  3 Sheets-Sheet 1

Gustav Victor Lachmann
George Rudolph Volkert
Walter James Ware
Inventors
By

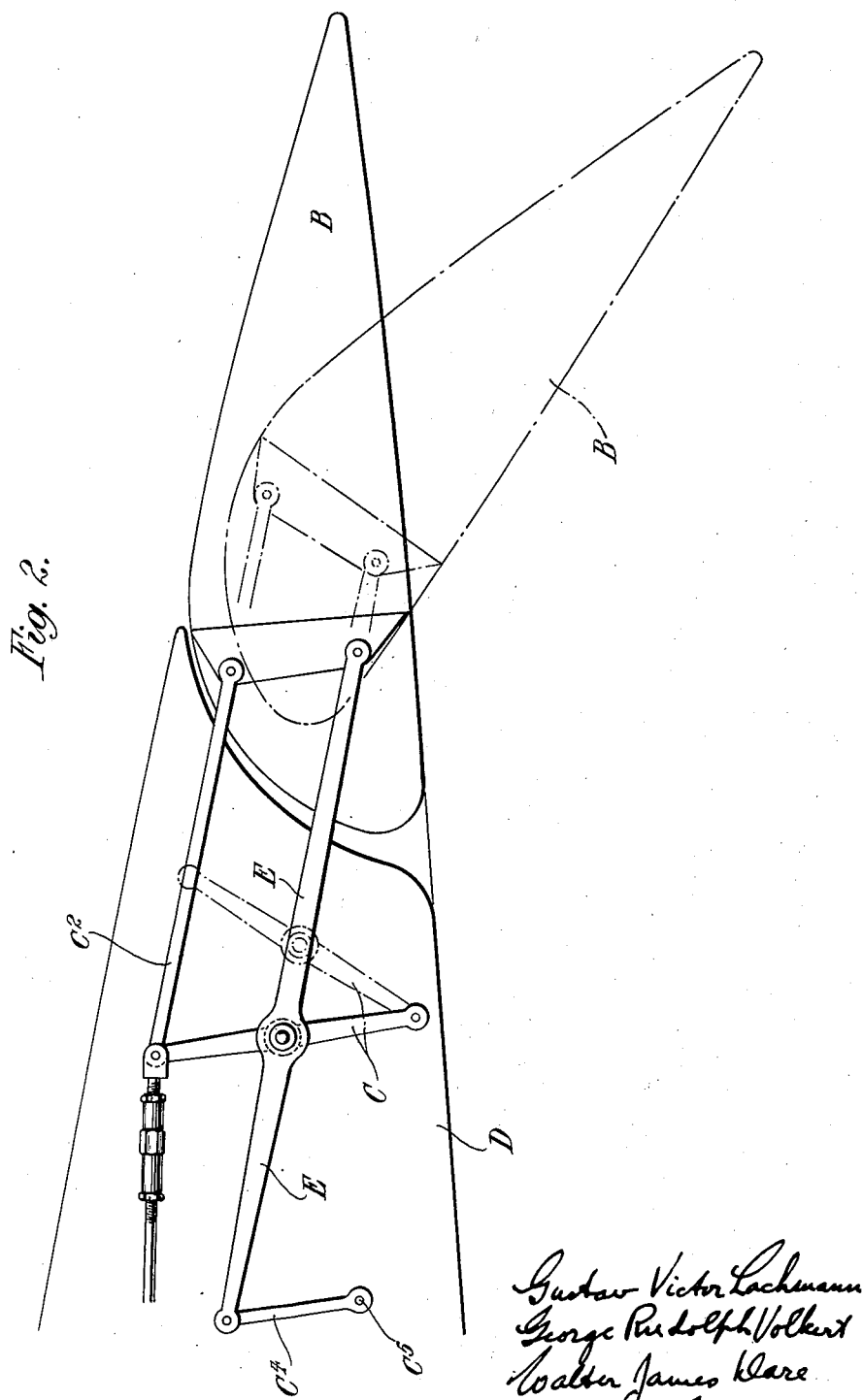

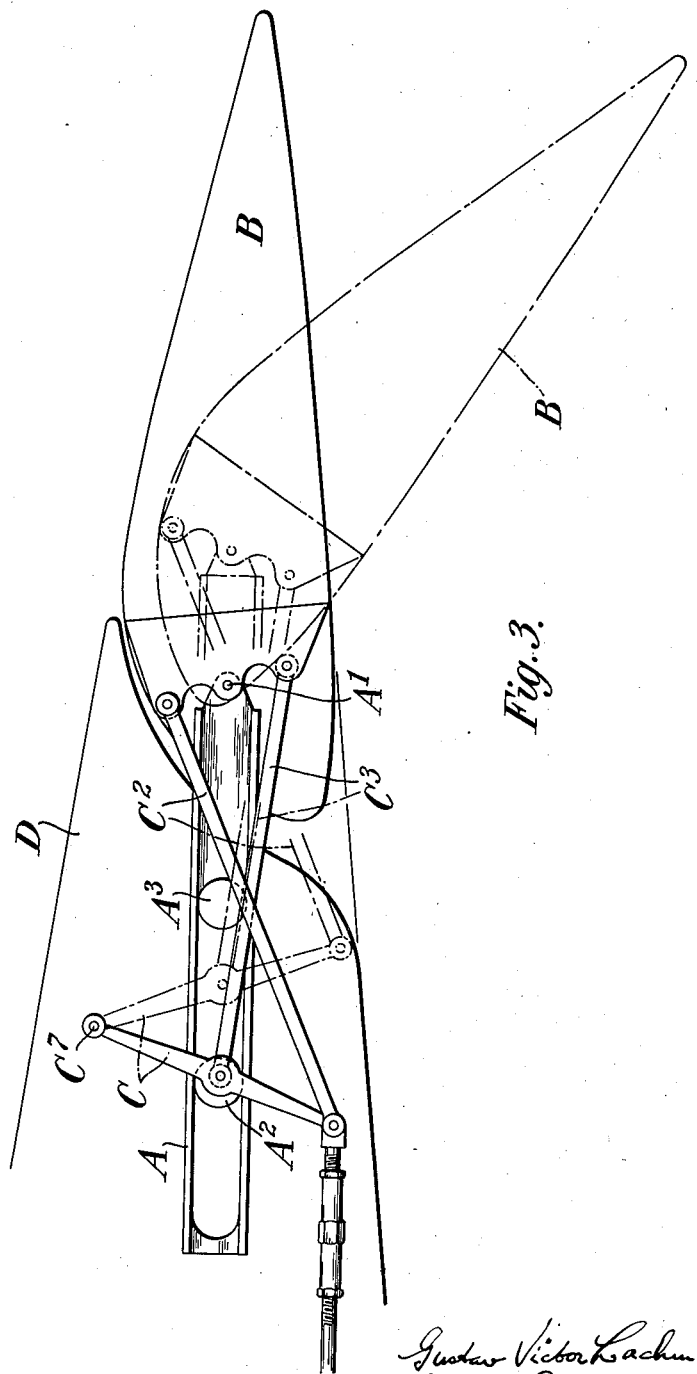

Patented July 6, 1937

2,086,085

UNITED STATES PATENT OFFICE 2,086,085

AIRCRAFT CONTROL GEAR

Gustav Victor Lachmann, George Rudolph Volkert, and Walter James Dare, Cricklewood, England, assignors to Handley Page Limited, London, England Application October 3, 1935, Serial No. 43,463
In Great Britain May 14, 1935

11 Claims. (Cl. 244—42)

This invention relates to control gear for ailerons or flaps or other aerofoil surfaces movable relatively to the main part of a wing, and of the type in which the movement of such surfaces relatively to the wing is compounded of a translational and a rotational motion. While the invention relates both to ailerons, flaps and like members, it will, for convenience be described hereinafter simply with reference to flaps, and the term "flap" is to be understood as including an aileron or other aerofoil surface.

It is known practice to have flaps of this type moving about a centre or pivot located below the undersurface of the flap and aft of the nose of the flap, the said pivot being fixed to the main wing by an external arm or outrigger and the flap being connected to such pivot by an external arm or outrigger, which is adapted to be rotated about the said centre or pivot so as to vary the position of the flap relatively to the wing.

It is also known practice to have slotted flaps moving on a system of links, the links being supported by a rearwardly extending arm from the main wing, which arm is external to the profile of the wing.

These methods of fixing give rise to combined translational and rotational motion of the flap relatively to the main wing, but they have the disadvantage that such mechanisms are usually external to the wing, thereby increasing the air resistance of the wing.

The object of the present invention is to provide mechanisms suitable for the operation of flaps of the type described above in which the entire mechanism is housed completely within the wing envelope contour.

The invention accordingly provides a control gear for flaps of the type described comprising in combination a member housed within a main part of the wing and extending to provide a pivot for a flap, said member being mounted for fore and aft movement relatively to the said main part, a flap pivoted to said member, a radius link located in the main part of the wing and pivoted at its one end to the wing and free at its other end, a reciprocating link pivoted to said radius link at a point other than its pivot on the wing and pivoted to said flap at a point other than the pivot of said flap on said member and means for preventing independent movement of the said radius link or said member whereby, when translational movement is imparted to said member said links rotate said flap relative to said main part of the wing.

The means for preventing independent movement of the said radius link or the said member, may consist of a connection between the two parts or, alternatively it may consist of an additional reciprocating link pivotally connected to the radius link and the flap in such positions as to prevent said independent movement.

The arrangement is such that the flap is lowered when the supporting member is moved rearwardly. In order to effect this combined motion, any point on the flap located above the pivot of the flap on the supporting member, must be given a greater rate of translational motion than the pivot, and conversely any point of the flap located below the pivot must be given a lesser rate.

In the accompanying drawings the invention is shown diagrammatically, by way of example, Figure 1 illustrating one embodiment, Figure 2 a further embodiment, and Fig. 3 a modification of Fig. 1.

In the embodiment of the invention shown in Figure 1, the fore and aft moving member is constituted by a track A to which the flap B is pivoted at $A^1$ its rearward end, the said track being slidable on rollers $A^2$, $A^3$ fixed to the wing. Movement of the track A on the rollers $A^2$, $A^3$, therefore, provides the translational movement of the flap B. Instead of the rollers $A^2$, $A^3$ other guide members could be employed.

Rotational movement of the flap B is effected by a link system interconnecting and pivotally attached to the flap and wing. This link system comprises a radius link C having one of its ends pivotally attached to the wing at $C^1$ and is connected by reciprocating links $C^2$, $C^3$ to the flap B. Thus when this radius link C is pivoted at its lower end to the main wing, then the reciprocating links $C^2$, $C^3$ will be connected to the radius link C in the order of their connections to the flap. When as shown in the modification in Fig. 3 the radius link C is pivoted at $C^7$ on its upper end to the main wing D, then the reciprocating links $C^2$, $C^3$ will cross one another and will be connected to the radius link C in the inverse order of their connections to the flap.

Alternatively, if the track to which the flap is pivoted be pivotally connected to the radius link C, then only one reciprocating link $C^2$ between the radius link C and the flap B is necessary.

If now the track A be moved rearwardly, the flap B pivoted to it will be moved away from the wing D and at the same time rocked downwardly by the action of the reciprocating links $C^2$, $C^3$. Conversely if the track A be moved forwardly from a rearward extended position, the flap B will be moved towards the wing D, and at the same time rocked upwardly by the action of the reciprocating links C², C³.

In the case of a slotted flap, the slot may be closed when the flap is in its normal or forward positions, or, alternatively, there may be always a gap between the leading edge of the flap and the trailing edge of the wing.

In a further example of construction according to the invention, and a development of the one already described and shown in Figure 2, the sliding track A is replaced by a beam member E which can be moved in a fore and aft direction relatively to the wing and is located within the wing envelope. This beam has the flap pivoted to it at its rearward end and at other intervals along its length, it is carried on pivoted radius links C and C⁴ which are in turn pivoted at their other ends to the main wing D. When, therefore, the links are moved about their main wing pivots C⁵ and C⁶, the beam E will be caused to move fore and aft relatively to the wing D and thus effect the desired translational movement of the flap B.

In order to give the flap B a rotational movement simultaneous with the translational movement, a reciprocating link C² is pivotally attached to the flap B at a point other than the pivot of the flap on the beam. The other end of the reciprocating link C² is pivotally attached to the radius link C at a point other than the points of attachment of said radius link to beam or link to wing. Instead of attaching the said reciprocating link C² to the link C only, it may also be attached to both the links C and C⁴ at points other than the points of attachment of said radius links to the beam or links to the wing.

The point of attachment of this reciprocating link C² to the radius link C or links C, C⁴ is such as to give the desired order of rotation of the flap when the beam member is moved either forwardly or rearwardly according to the principles already described. In the case of the slotted flap, the slot can be closed when the flap is in its normal or forward position, or alternatively there can be a gap always between the leading edge of the flap and the trailing edge of the wing.

In yet a further example of construction, which combines the characteristics of those first described, either of the rollers in the first example is replaced by its mechanical equivalent, a simple link attached at one end to the wing and at the other to the track.

Whilst the mechanism has been described with reference to flaps or ailerons situated at the rear part of the wing, it can be used to provide translational and rotational movements of any portion or portions of a wing relatively to another or other fixed portions of the wing. For example, the same mechanism can be used when the moving portion of the wing is located at the forward end of the main wing.

What we claim as our invention and desire to secure by Letters Patent is:—

1. Aircraft control gear comprising a track housed within the contour of a wing, guide members fixed to said wing and slidably supporting said track for fore and aft translational movement relative to the wing, a flap pivoted to said track, a radius link housed within the wing and pivoted at its lower end to the wing and having its upper end free, a reciprocating link pivoted to the free end of said radius link and pivoted to the flap above the point at which the flap is pivoted to the track and a reciprocating link pivoted intermediate the ends of the radius link and pivoted to the flap below the point at which the flap is pivoted to the track, said reciprocating links being also housed within the wing, whereby when said track and flap are given a translational movement the flap is rotated by the links relatively to the wing.

2. Aircraft control gear comprising a track housed within the contour of a wing, guide members fixed to said wing and slidably supporting said track for fore and aft translational movement relative to the wing, a flap pivoted to said track, a radius link housed within the wing and pivoted at its upper end to the wing and having its lower end free, a reciprocating link pivoted to the lower end of said radius link and pivoted to the flap above the point at which the flap is pivoted to the track and a reciprocating link pivoted to the radius link intermediate its ends and pivoted to the flap below the point at which the flap is pivoted to the track, said reciprocating links being arranged to cross one another and being also housed within the wing, whereby when said track and flap are given a translational movement the flap is rotated relatively to the wing.

3. Aircraft control gear comprising a beam member housed within the contour of a wing, radius links housed within the wing contour for mounting said beam member for fore and aft translational movement relative to the wing, a flap pivoted to said member, a reciprocating link also housed within the wing and pivotally attached at its one end to the flap at a point other than the pivot of the flap on the beam member and pivotally attached at its other end to at least one of said radius links at a point other than the points of attachment of the radius link to the beam member and wing, whereby when said beam member and flap are given a translational movement the flap is rotated relatively to the wing.

4. In an aeroplane having a wing and a flap, means associating the flap with the wing comprising a radius link within the wing pivoted at one end to the wing, two links pivoted at spaced points on the radius link and at spaced points on the flap, means for limiting the extent and direction of the thrust of said links and means for rotating the radius link.

5. In an aeroplane having a wing and a flap, means associating the flap with the wing comprising a radius link within the wing pivoted at one end to the wing, means for angularly adjusting the radius link, two links pivoted on the radius link at two points spaced apart from each other and from the pivot of the radius link and pivoted at spaced points on the flap and arranged so that one link imparts to its pivot on the flap a different rate of movement to that imparted by the other link to its pivot on the flap, and means for limiting the direction of thrust of at least one of said links.

6. In an aeroplane having a wing and a flap, means associating the flap with the wing comprising a radius link within the wing pivoted at one end to the wing, means for angularly adjusting the radius link, two links pivoted on the radius link at two points spaced apart from each other and from the pivot of the radius link and pivoted at spaced points on the flap and arranged so that one link imparts to its pivot on the flap a different rate of movement to that imparted by the other link to its pivot on the flap, a track housed within the wing extending rearwardly and being pivoted at its rear and to the flap, and a guide for said track to limit the direction of thrust of said links.

7. In an aeroplane having a wing and a flap, means associating the flap with the wing comprising a radius link within the wing pivoted at its upper end to the wing, means for angularly adjusting the radius link, two links pivoted on the radius link at two points spaced apart from each other and from the pivot of the radius link, said two links being arranged to cross each other and being pivoted at spaced points on the flap and arranged so that one link imparts to its pivot on the flap a different rate of movement to that imparted by the other link to its pivot on the flap, a track housed within the wing, extending rearwardly out of the wing and being pivoted at its rear end to the flap, and a guide for said track for limiting the extent and direction of thrust of at least one of said links.

8. In an aeroplane having a wing and a flap, means associating the flap with the wing comprising a radius link within the wing pivoted at one end to the wing, means for angularly adjusting the radius link, two links pivoted on the radius link at two points spaced apart from each other and from the pivot of the radius link and pivoted at spaced points on the flap and arranged so that one link imparts to its pivot on the flap a different rate of movement to that imparted by the other link to its pivot on the flap, a track housed within the wing, extending rearwardly out of the wing and being pivoted at its rear end to the flap at a point spaced apart from the pivots of said links on the flap, and a guide for said track for limiting the extent and direction of thrust of at least one of said links.

9. In an aeroplane having a wing and a flap, means associating the flap with the wing comprising a radius link within the wing pivoted at one end to the wing, means for angularly adjusting the radius link, a reciprocating link pivoted on the radius link at a point spaced apart from the pivot of the radius link and pivoted on the flap, a beam pivoted intermediate its ends to said radius link at a point spaced apart from the pivot of the radius link and spaced apart from the pivot of said reciprocating link on the radius link and pivoted at its rear end to said flap at a point spaced apart from the pivot of said reciprocating link on the flap, and a second radius link within the wing pivoted at one end to the wing and at its other end to the front end of said beam for limiting the direction of thrust of said beam.

10. In an aeroplane having a wing and a flap, means associating the flap with the wing comprising a radius link within the wing pivoted at one end to the wing and free at its other end, means for angularly adjusting the radius link, a reciprocating link pivoted on the free end of the radius link and pivoted on the flap, a beam pivoted intermediate its ends to said radius link at a point spaced apart from the pivot of the radius link and spaced apart from the pivot of said reciprocating link on the radius link and pivoted at its rear end to said flap at a point spaced apart from the pivot of said reciprocating link on the flap, and a second radius link within the wing pivoted at one end to the wing and at its other end to the front end of said beam for limiting the direction of thrust of said beam.

11. In an aeroplane having a wing and a flap, means associating the flap with the wing comprising a radius link within the wing pivoted at one end to the wing and free at its other end, means for angularly adjusting the radius link, a reciprocating link pivoted on the free end of the radius link and pivoted on the flap, a beam pivoted intermediate its ends to said radius link at a point spaced apart from the pivot of the radius link and spaced apart from the pivot of said reciprocating link on the radius link and pivoted at its rear end to said flap at a point spaced apart from the pivot of said reciprocating link on the flap, said reciprocating link being arranged to impart to its pivot on the flap a different rate of movement to that imparted by the beam to its pivot on the flap, and a second radius link within the wing pivoted at one end to the wing and at its other end to the front end of said beam for limiting the direction of thrust of said beam.

GUSTAV VICTOR LACHMANN.
GEORGE RUDOLPH VOLKERT.
WALTER JAMES DARE.